Aug. 23, 1966    G. I. CADE ETAL    3,268,364
FUEL CELL CONTROL SYSTEM
Filed Jan. 29, 1962    3 Sheets-Sheet 1

INVENTORS
GEORGE I. CADE,
WILLIAM A. SNIDARICH
BY
*Alfred N. Feldman*
ATTORNEY

Aug. 23, 1966  G. I. CADE ET AL  3,268,364
FUEL CELL CONTROL SYSTEM
Filed Jan. 29, 1962  3 Sheets-Sheet 2

INVENTORS
GEORGE I. CADE,
WILLIAM A. SNIDARICH
BY
ATTORNEY

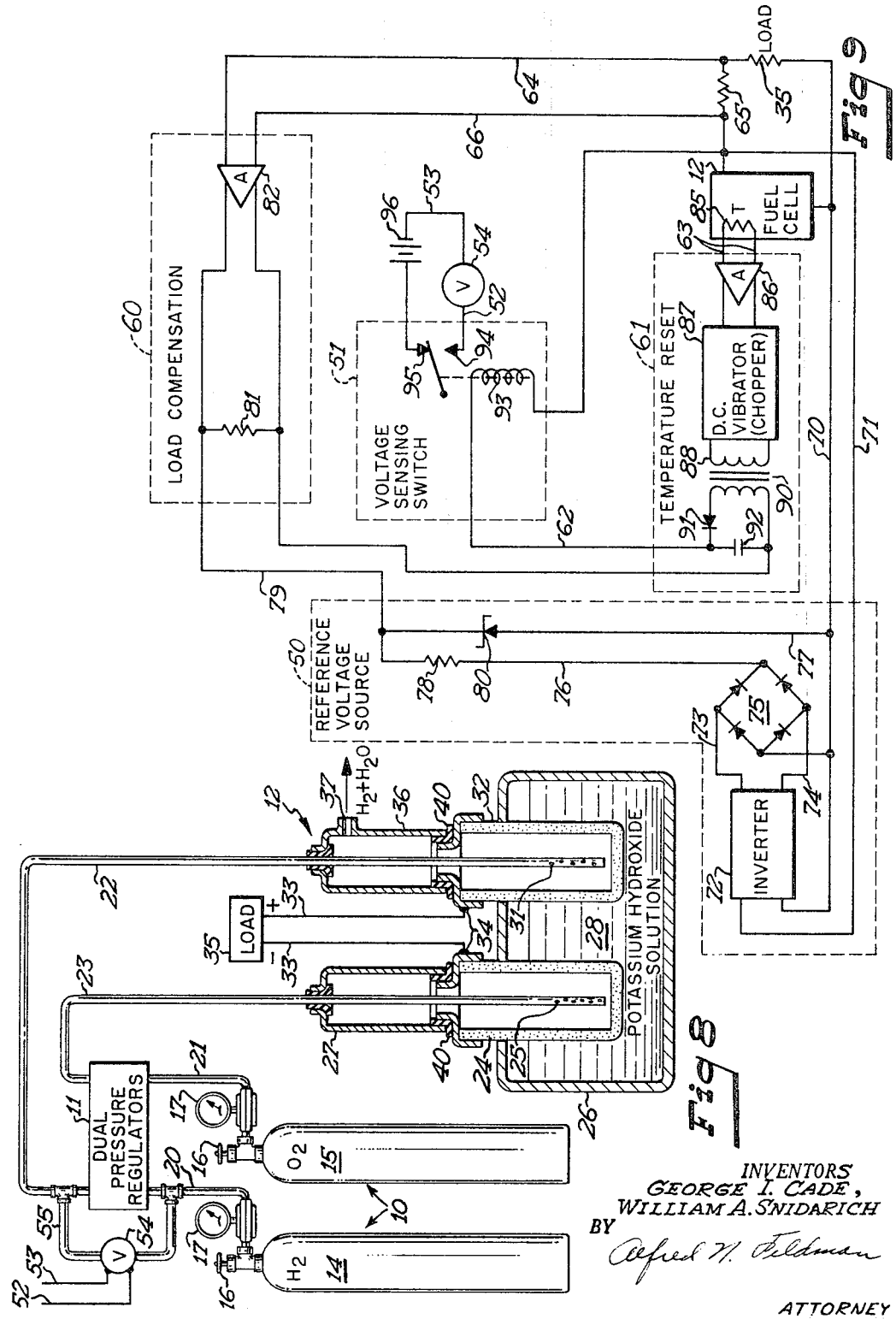

United States Patent Office 3,268,364
Patented August 23, 1966

3,268,364
FUEL CELL CONTROL SYSTEM
George I. Cade, St. Louis Park, and William A. Snidarich, Gilbert, Minn., assignors to Honeywell Inc., a corporation of Delaware
Filed Jan. 29, 1962, Ser. No. 169,576
5 Claims. (Cl. 136—86)

The present invention is directed to a system for controlling a fuel cell to maintain a high level of electrical output, and more particularly is directed to the concept of utilizing one of the fuels supplied to the cell to purge or remove a product developed within the cell thereby keeping the cell's efficiency high with a resultant maximum voltage output.

The conversion of fuels into electricity for a long period of time has been accomplished by burning the fuels and subsequently converting the heat into a source of driving power for an electric generator. Due to the inherent losses of this type of system, the net useable energy from the system is approximately 30% of the fuel's total energy. This type of arrangement obviously is highly inefficient and as such, investigations have long been underway into means of converting fuels directly into electrical energy without passing through a stage of heat conversion. For many years a transformation of fuel directly into electrical energy has been theoretically recognized and various types of cells for this type of operation have been tested. Basically the cells are referred to as fuel cells, a simple battery being one special case of a fuel cell.

One general type of fuel cell is an arrangement wherein two fuels are caused to react to generate an electric current. For convenience, the term "two fluids" has been used in a very general sense and includes the more commonly used term of "fuel" and "oxidant." Probably one of the most common types of fuel cells is a cell wherein hydrogen and oxygen are fed into cavities that form electrodes for the unit. These electrodes normally are of a material such as carbon and allow for the hydrogen and oxygen to pass into their surface, since carbon can be made as a rather porous material. Hydrogen and oxygen then come in contact with an electrolyte, which can be a material such as potassium hydroxide. The reducing agent or fuel loses an electron at the electrolyte-electrode interface. The oxidant gains an electron at the opposite electrode forming an anion. The internal circuit is completed by ionic conduction. For convenience, this reaction will be referred to as a chemical reaction with the electrolytic material. The depleted material from this type of a cell is a flow of hydrogen and water vapor from one electrode and excess oxygen from the other electrode. The water generated by this reaction tends to continue to dilute the potassium hydroxide electrolyte and thereby reduces the output voltage of the cell. The removal of this water is essential and the present invention is directed to a system of operating a fuel cell so that the rate of removal of the water, or reartion product, can be controlled so as to maintain a maximum voltage from the unit.

In the present invention the exact type of fuel cell is not of great importance, but one will be described in some detail in order to correlate the material as to the inventive control system. The present invention lies in controlling one of the fuels, in a fluid form, to the fuel cell so as to obtain maximum voltage output. In order to understand the need for a control system it is pointed out that upon loss of control of the cell, wherein the two fluids are fed into the cell indiscriminately, the efficiency of the cell can drop rather drastically. A fuel cell, when operating properly, can have a practical efficiency as high as 80%. As a loss of control occurs, this efficiency can drop substantially. In addition to the loss of efficiency, a fuel cell can be mechanically injured by the application of improper rates of fuel flow and hazardous conditions can be the result. The present invention recognizes the need of maintaining the concentration of the electrolyte at a particular level and this control of the concentration can be easily accomplished by the present control system. Broadly, the present novel control system is directed to the idea of adding an excess of one of the fuels (hydrogen in the case of a hydrogen and oxygen cell), to purge the electrolyte of the reaction product that tends to dilute the electrolyte thereby keeping its concentration at a proper level for maximum voltage output. Since most fuel cell systems recirculate any excess fuel, or any fuel and reaction product that is evolved, there is in fact no great loss by utilizing an excess of one of the fuels to purge the electrolyte and thereafter recovering the fuel for further use.

It is a primary object of the present invention to disclose a control system applicable to most types of fuel cells to keep their operation at or near their maximum output voltage.

A further object of the present invention is to provide a control system that regulates the level of the control to match varying loads and temperature conditions.

Yet another object of the present invention is to disclose a control system that purges a fuel cell of at least one reaction product that results during operation of the fuel cell and which is detrimental to its continued operating efficiency.

Still a further object of the present invention is to disclose a fuel cell control system wherein the control responds to an easily measured output of the cell, that is, the voltage output from the cell.

Yet a further object of the present invention is to disclose a fuel cell control system that is capable of measuring the concentration of a corrosive electrolytic fluid accurately by measuring a result of a change in the fluid and not by measuring the fluid itself.

These and other objects will become apparent when the present invention is considered with the accompanying drawings wherein:

FIGURE 8 is a simplified disclosure of a typical hydrogen and oxygen fuel cell that is used as an example of one preferred embodiment of the present invention, and;

FIGURE 9 is the schematic representation of the block diagram of the control system disclosed in FIGURE 6.

Figure 1:
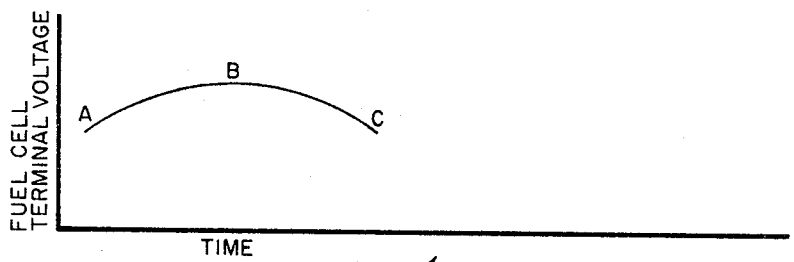
FIGURE 1 is a graphic representation of the variation in output of a fuel cell with a change in concentration of its electrolyte.

In order to understand the present invention, a disclosure of a simple hydrogen and oxygen type of fuel cell has been provided in the present material. The disclosure of this particular cell forms no part of the present invention and is made solely for the purpose of explaining the operation principle upon which the fuel cell control system functions. In FIGURE 8 there is generally disclosed a representation of a source of fluid fuels 10, a dual pressure regulator 11, and a fuel cell at 12. The fuel source 10 consists of a pressurized bottle of hydrogen 14 and a pressurized bottle of oxygen 15. The pressurized bottles each have a control valve 16 and a pressure regulator 17. By opening the valve 16 a rough regulation of pressure output can be obtained by setting the pressure regulators 17 to a desired level. This places a roughly regulated hydrogen pressure in pipe 20 and a similarly regulated pressure of oxygen in pipe 21. The pipes 20 and 21 feed the dual pressure regulator 11 which functions to more carefully regulate the fuel to the fuel cell 12 at a rate determined by the desired operating characteristics of the system. The exact nature of the dual pressure regulators 11 is not material to the present invention. At this point it is enough to state that the output of the dual pressure regulator 11 is in pipes 22 and 23 to the fuel cell 12. The fluid output of hydrogen and oxygen in pipes 22 and 23 is carefully regulated by the regulator 11 and the regulator 11 contains all of the necessary safety equipment to shut off the supply of fuel to the cell 12 in case of failure of either the hydrogen or oxygen supplies. The oxygen in pipe 23 is fed into a carbon electrode 24 through holes 25 in the end of pipe 23. The oxygen in the electrode 24 diffuses into the walls of the carbon electrode with a potassium hydroxide solution 28 that fills a container 26 into which the electrode 24 is sealed. The excess oxygen passes from the electrode 24 to an upper chamber 27.

The hydrogen supplied through pipe 22 is fed through holes 31 into a chamber formed by electrode 32. The electrode 32 is identical to that of 24 and allows the hydrogen to diffuse into its surface with the potassium hydroxide solution 28. Here the hydrogen unites with hydroxyl ions which have migrated through the electrolyte from the electrode 24 and releases an electron. The electron is the work performing product of the fuel cell and flows in an external electric circuit. This circuit is disclosed as wires 33 connected to the top of the electrodes at 34 and going to an electric load 35. The excess hydrogen and a reaction product, in the form of water, pass into the upper chamber 36 that is attached to the top of the electrode 32 and passes out of pipe 37 to the atmosphere. The hydrogen and excess water that flow out of pipe 37 could be recirculated in appropriate equipment wherein the hydrogen would be dried and then returned to the fuel supply. The recirculation equipment is well known in the art and has not been shown in the present application in order to simplify the discussion. The electrodes 24 and 32 are electrically insulated by insulating members 40 to keep the upper chambers 27 and 36 separate, from an electrical standpoint, from the electrodes 24 and 32.

In the operation of a normal hydrogen and oxygen fuel cell, the hydrogen and oxygen are supplied at a rate just sufficient to maintain the reaction required in the fuel cell. If any excess hydrogen is available it picks up a slight amount of the reaction product in the form of water, and removes this water from the system. Normally the fuel being admitted is not in excess of the quantity required to maintain the reaction to produce the desired level of current and thereby does not carry off the reaction product at the rate being formed, but carries it off only in insignificant quantities as the hydrogen flows through the cell. The present invention is specifically directed to the admission of hydrogen or fuel in an excess of the quantity normally reacting to produce the current being drawn from the cell and this excess thereby carries off with it the reaction product in sufficient quantities to keep the concentration of the potassium hydroxide solution 28 at a level to maintain the maximum voltage output from the fuel cell. For simplicity's sake it is understood that when reference is made to the removal of the reaction product released to maintain the maximum output voltage, that this function is obtained by supplying an excess of hydrogen or fuel to the device above and beyond that which is normally used to produce the desired current output from the fuel cell.

In one particular type of hydrogen and oxygen fuel cell, the potassium hydroxide electrolyte solution 28 is contained in the electrodes in an asbestos matrix. The electrical output of this type of cell is related to the concentration of the contained electrolyte and to achieve best results it is necessary to maintain the potassium hydroxide electrolyte solution near some particular concentration. When electrical power is drawn from this type of fuel cell, water is formed as a reaction product. This formed water must be withdrawn from the cell at the rate at which it is being formed or the electrical output will be degraded as a result of the change in the concentration of the potassium hydroxide electrolyte solution. In tests with this type of fuel cell, it has been possible to control the rate of water removal by varying the amount of exhaust hydrogen. In order to accomplish the precise removal of water, the operation of the cell was initially accomplished with a constant electrical load.

Figure 2:
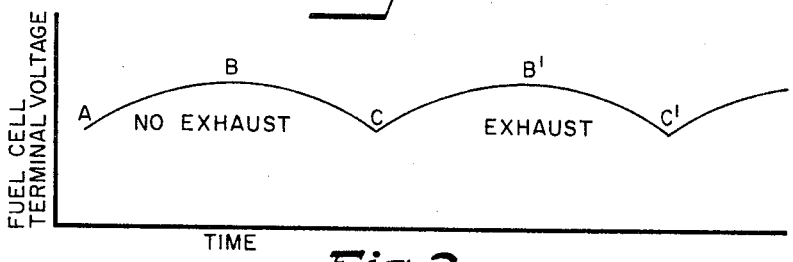
FIGURE 2 is a graph representing the variation in output as the invention is applied to a cell.
Figure 3:
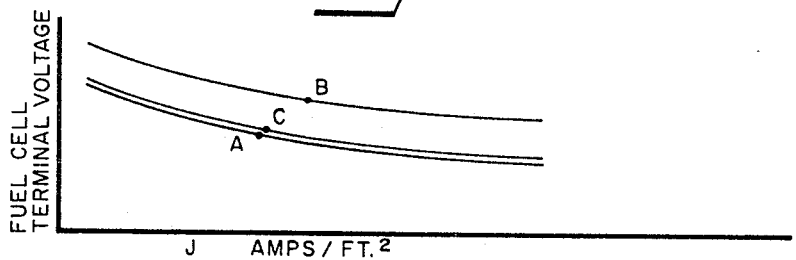
FIGURE 3 is a graphic representation of change in efficiency of a cell at points shown in FIGURE 2.
Figure 4:
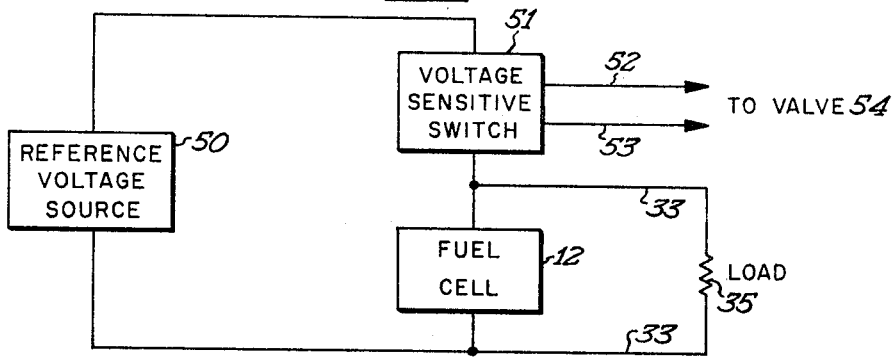
FIGURE 4 is a simple control system for maintaining a maximum voltage output from a fuel cell wherein the load and temperature of the cell are held constant.

In the graphs in FIGURES 1 to 3 and the circuit of FIGURE 4, a cell of the hydrogen oxygen type was started with a constant load and with an electrolyte solution that was above the optimum concentration for the highest electrical output. The fuel supply to the cell was deadened or the exhaust line closed off so that the cell was unable to carry off the water waste or reaction product. As the cell was operated, its initial output or terminal voltage is shown at A in FIGURE 1. The output of the cell is plotted in FIGURE 1 as a function of time and yields a characteristic that is indicative of the present invention.

When the cell is started up, the output to the constant load is at a value that is previously indicated at point A. Since there is no way for the water being formed to leave the cell, the output increases as the electrolyte concentration is diluted by the reaction product, and at point B the concentration reaches an ideal condition. As the operation continues, the performance of the cell declines to point C due to the continued dilution of the electrolyte. At point C, the flow of hydrogen gas was increased to several times the amount required for the electrical output, and the exhaust hydrogen then began to remove the water faster than it was being formed. This is shown by reference to FIGURE 2 where the first part of the graph shows the operation with no exhaust and the decline of the cell output to point C. As the excess of gas flows, the reaction product water is removed and the terminal voltage again begins to rise as is shown by the curve reaching a height B'. As the removal of water or reaction product is continued, the concentration of the electrolyte again exceeds the optimum thereby decreasing the output voltage from the fuel cell to C'. If the cycle is then repeated, that is the exhaust being closed off, the output voltage begins to rise once again.

Any segment of the characteristic curve shown in FIGURE 2 may be displayed as points on a family of voltage and ampere characteristic curves as displayed in FIGURE 3. The points A, B, and C in FIGURE 3 have been labeled to correspond with the similarly labeled points of FIGURES 1 and 2. It is understood that the position of the voltage and current characteristic curves is dependent on the cell's being maintained at a constant temperature as explained with the simplified explanation shown in FIGURES 1 through 3.

The characteristics noted in FIGURES 1 to 3 form the heart of the present invention and may be adapted to obtain moisture control and voltage control in a cell by means of a reference voltage means and a voltage sensitive switch. FIGURE 4 shows a block diagram of a simple control circuit utilized to take advantage of the present invention and is applied to a system that has a stable temperature and which has a constant load. A stable voltage reference means or source 50 is applied across a voltage sensitive control means or switch 51 and the fuel cell 12. Once again the conductors 33 are shown connecting the load 35 to the fuel cell 12. The voltage sensitive switch 51 has a pair of output conductors 52 and 53 which are shown going to a valve 54. The application of the output of the voltage sensitive switch 51 can be applied to the fuel cell of FIGURE 8 by applying conductors 52 and 53 to corresponding conductors 52 and 53 disclosed in FIGURE 8. The conductors 52 and 53 go to a valve 54 that is in a section of pipe 55 that is capable of by-passing the dual pressure regulator 11 in the hydrogen line 20. It is thus obvious that when the valve 54 is energized to open the bypass pipe 55, that an excess of hydrogen is applied to pipe 22 of the fuel cell thereby supplying the excess needed to remove the reaction product or water from the potassium hydroxide solution 28.

Once again in FIGURE 4, the voltage reference source 50 can be any type of voltage reference but in its simplest form would be a fixed voltage. The voltage sensitive switch 51, can in its simplest form, be a relay that is sensitive to a particular differential of voltage. It is thus obvious that when the fixed voltage source 50 is applied to the fuel cell 123 that any variation in the output voltage of the fuel cell will vary the differential across the voltage sensitive switch 51. The variation at a terminal voltage referenced in FIGURE 2 at C gives a sufficient voltage to activate the switch to energize the switch 51 thereby pulling the relay in and energizing the control to valve 54. The energization of valve 54 supplies an excess of hydrogen thereby beginning the removal process of the reaction product, or water. As the removal continues the voltage rises to B', thereby decreasing the voltage difference between the fuel cell and the voltage reference source 50. As soon as the differential changes to the point where the relay can no longer be held in, the voltage sensitive switch or relay 51 drops out thereby cutting off the excess supply of hydrogen. As soon as the excess is cut off, at point B', the fuel cell starts to generate an excess of water once again thereby starting down the curve towards C'. As soon as the cell reaches point C', the voltage sensitive switch is again energized and the fuel cell begins to obtain an excess of hydrogen once again for the removal of the reaction product or water. It is thus apparent that with the simple control circuit shown in FIGURE 4, it is possible to control a hydrogen-oxygen fuel cell for a maximum output of a terminal voltage as long as the temperature of the system is constant and as long as the load is constant.

Figure 5:
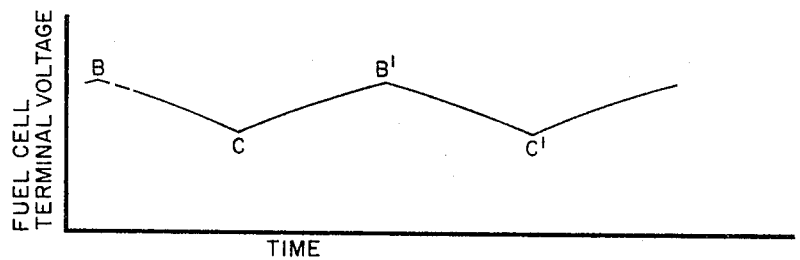
FIGURE 5 is a graphic representation of test results of the output of a cell when operated with a system of the type disclosed in FIGURE 4.

FIGURE 5 discloses an experimental curve representative of the change in the fuel cell terminal voltage as the control system disclosed in FIGURE 4 operates. The voltage varies from a maximum at B to a minimum at C and then back up to B', and onward giving a somewhat regulated terminal voltage. By refining the control points and system, it is possible to obtain a fuel cell control that gives a relatively constant, maximum terminal voltage from the system.

Figure 6:
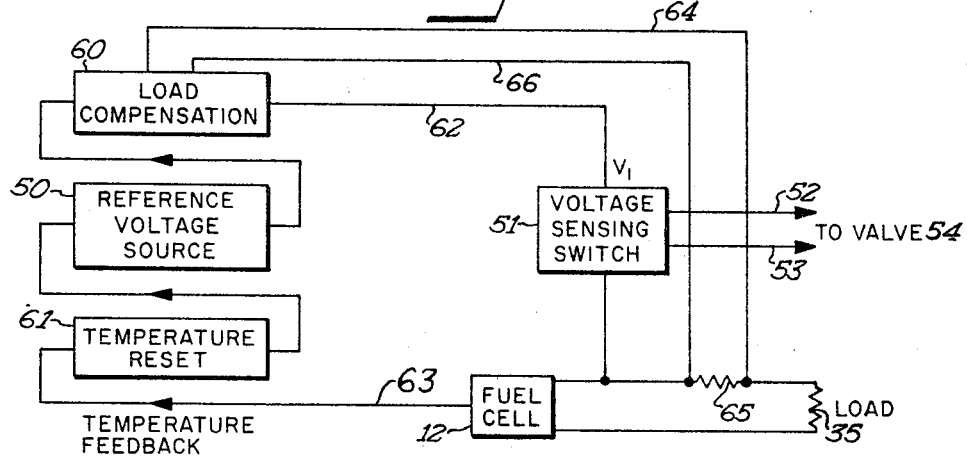
FIGURE 6 is a schematic of a system wherein compensation is available for both varying load and temperature, and which maintains a maximum voltage output.

Since it is not possible to normally obtain a fuel cell that remains at a constant temperature or is operated with a constant load, adjustment must be made in the control system in order to control a varying load with a varying fuel cell temperature. The fuel cell temperature will vary due to the variances in ambient conditions around the fuel cell and also due to the difference in the impedance losses in the fuel cell itself, as current is drawn from the cell. The current drawn from the cell and the internal impedance of the cell generate a certain amount of heat and this heat will vary depending on load conditions. In FIGURE 6 a fuel cell control system is disclosed utilizing the present principles but the system incorporates compensation for variations in the load and in the temperature. Once again a voltage reference source 50 is supplied, but in this case the voltage reference source is placed between a load compensation voltage generating means 60, and a temperature compensating voltage generating means 61. The load compensation means 60, the voltage reference source 50, and the temperature reset means 61 are hooked in series and form a reference voltage means generally. The output voltage of the combination of 50, 60, and 61 is taken between conductors 62 and 63 in the same sense that the output voltage of the reference voltage source 50 was obtained in connection with FIGURE 4. Again a voltage sensitive switching means 51 is provided and again this can be a simple differential relay that is capable of switching power on conductors 52 and 53 to the valve 54.

The load compensation means 60 is controlled by a pair of conductors 62 and 66 which are connected across a resistance 65. The resistance 65 has a varying voltage developed across it as the voltage supplied to the load 35 varies when connected to the fuel cell 12. As an increased current is drawn by load 35 an increased voltage drop appears across the resistor 65 and this voltage is reflected back into the load compensation means 60 thereby increasing the reference voltage output on conductors 62 and 63. The temperature of the fuel cell is picked up by a conventional temperature sensing means in the fuel cell 12 and is supplied to the temperature reset means 61 by conductor 63. The temperature feedback on conductor 63 again varies the voltage output from the temperature reset means 61 to provide an adjustment for variations in the internal temperature of the fuel cell 12.

Figure 7:
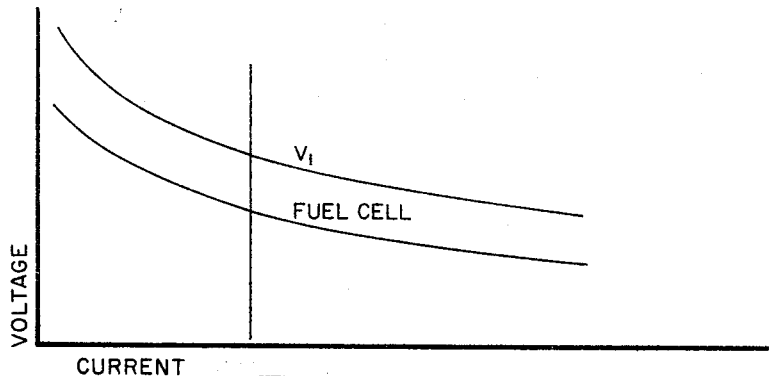
FIGURE 7 is a graph of the output of a cell with temperature and load compensations.

In FIGURE 7 there is disclosed a curve showing a fuel cell 12 operating from a system of the type disclosed in FIGURE 6. The reference voltage means of this system includes blocks 50, 60, and 61, and functions generally as a voltage source supplying voltage $V_1$. The load compensation is connected in series with the reference source and will be influenced by the main load so that the voltage will follow the characteristics of the fuel cell. As the characteristics of the fuel cell 12 shift with varying temperature and load, the output reference voltage $V_1$ from conductor 62 to 63 will vary along a parallel line so as to provide a constant differential voltage to which the voltage sensing switch can compare for control purposes.

In order to clarify the content of the block diagram of FIGURE 6, a specific circuit is disclosed in FIGURE 9 which fills in each of the individual blocks. The reference numerals of FIGURE 6 will be carried over into FIGURE 9 for comparative purposes. The voltage reference source 50 which forms part of the voltage reference means generally is nothing more than a stable voltage output. The output is obtained by supplying the fuel cell voltage across conductors 70 and 71 to a conventional inverter 72 which in turn converts the voltage to an alternating current on conductors 73 and 74. The alternating current is rectified by a full wave bridge 75 and is supplied to conductors 76 and 77 through a resistor 78. A zener diode 80 is placed across the resistor 78 and the bridge 75, and rectifies or stabilizes the voltage. A constant voltage is thereby developed on conductor 79 and this voltage remains constant with respect to ground or common conductor 70. The voltage reference source 50 thus is disclosed as a conventional power supply of constant voltage and is believed to require no further explanation.

The load compensation means 60 is nothing more than a resistor 81 placed across the output of a voltage amplifier 82 that is connected by conductors 62 and 66 across the resistor 65. Any variation in voltage appearing across resistor 65 is conducted by conductor 62 and 66 to the amplifier 82 where it is amplified and supplied as a voltage across the resistor 81. The resistor 81 is placed in series with the output of the voltage source 50 and thus the arrangement of FIGURE 6 for load compensation is carried out.

The temperature feedback and temperature reset means is disclosed in FIGURE 9 as a thermostat 85 placed within the fuel cell 12 and which has an output on conductors 63 to the temperature reset means 61. The temperature reset means 61 contains an amplifier 86 that amplifies any change in the output of thermostat 85 and supplies this to a conventional direct current vibrator or chopper 87, which in turn converts it to alternating current in its output 88. The output is transformed in transformer 90 and is rectified by the rectifier 91 and supplied across the condenser 92 as a direct current of varying magnitude dependent upon the temperature in the fuel cell 12. Once again the voltage appearing across the capacitor 92 is connected in series with the load compensation means 60 and the voltage reference source 50. As such, a voltage reference means which varies as temperature and output load varies has been supplied to the input of the voltage sensing switch 51. The voltage sensing switch 51 discloses a relay 93 having "in" and "out" contacts 94 and 95, which supply voltage from a source 96 to the valve 54.

It is believed that FIGURE 9 completely fills out the block diagram of FIGURE 6 with sufficient detail so that anyone skilled in the art can practice the present invention. The amplifiers and other conventional components disclosed in FIGURE 9 can be varied according to the desires of one skilled in the art to regulate the operation of the voltage sensing switch 51 so as to supply or cut off the hydrogen to the fuel cell at the appropriate time to obtain the appropriate removal of the reaction product or water from the cell.

The present invention is in no way limited to the use of the particular circuitry that has been shown for application to a hydrogen and oxygen fuel cell. The disclosure is merely an example of one specific embodiment of a system applied to a particular type of fuel cell, for illustrative purposes only. The present invention broadly entails a control system for a fuel cell wherein two fuels chemically react with an electrolytic material to liberate an amount of electric energy. The electric energy liberated is maintained at a maximum voltage level by comparing the output of the fuel cell to a voltage reference means and controlling one of the fuels to the cell so as to carry off any excess reaction product generated to maintain the electrolyte concentration at a proper level so as to continue to maintain a maximum voltage from the device. Since the disclosure has been illustrative only, the applicants wish to be limited in the scope of their invention only by the appended claims.

We claim as our invention:

1. A control system operating in conjunction with fuel cell means wherein a fuel and an oxidant chemically react with an electrolytic material to liberate electrical energy thereby generating an output voltage which can be applied to an external electric circuit, comprising; fuel cell means including electrode means capable of providing reaction area means wherein a fuel and an oxidant react with an electrolytic material to yield electric energy and at least one reaction product; said reaction product being released in said electrolytic material thereby affecting the output voltage of said fuel cell means; voltage reference means in circuit with voltage sensing means and including connection means connected to said output voltage to sense any variation in said fuel cell output voltage; means to simultaneously control the relative quantities of said fuel and said oxidant to said fuel cell; and additional means to change the relaitve quantities of said fuel and said oxidant with said additional means being controlled by said voltage sensing means to admit an excess of one of said fuel cell inputs to carry off said reaction product to in turn maintain maximum output voltage from said fuel cell means.

2. A control system operating in conjunction with fuel cell means wherein a fuel and an oxidant chemically react with an electrolytic material to liberate electrical energy thereby generating an output voltage which can be applied to an external electric circuit comprising; fuel cell means including electrode means capable of providing reaction area means wherein a fuel and an oxidant react with an electrolytic material to yield electric energy and at least one reaction product; said reaction product being released in said electrolytic material thereby affecting the output voltage of said fuel cell means; voltage reference means in circuit with a voltage sensitive relay and including connection means connected to said output voltage to sense any variation in said fuel cell output voltage; means to simultaneously control the relatve quantities of said fuel and said oxidant to said fuel cell; and an electric valve to change the relative quantities of said fuel and said oxidant with said electric valve being controlled by said relay to admit an excess of one of said fuel cell inputs to carry off said reaction product to in turn maintain maximum output voltage from said fuel cell means.

3. A control system operating in conjunction with fuel cell means wherein a fuel and an oxidant chemically react with an electrolytic material to liberate electrical energy thereby generating an output voltage which can be applied to an external electric circuit, comprising; fuel cell means including electrode means capable of providing reaction area means wherein a fuel and an oxidant react with an electrolytic material to yield electric energy and at least one reaction product; said reaction product being released in said electrolytic material thereby affecting the output voltage of said fuel cell means; voltage reference means in circuit with voltage sensing means and including connection means connected to said output voltage to sense any variation in said fuel cell output voltage; said voltage reference means including a voltage reference source connected to load compensation circuit means which varies said voltage reference means as said electric energy drawn from the fuel cell means varies; said voltage reference means further including a temperature reset circuit which varies said voltage reference means as an internal temperature of said fuel cell means varies; means to simultaneously control the relative quantities of said fuel and said oxidant to said fuel cell; and additional means to change the relative quantities of said fuel and said oxidant with said additional means being controlled by said voltage sensing means to admit an excess of one of said fuel cell inputs to carry off said reaction product to in turn maintain maximum output voltage from said fuel cell means.

4. A control system operating in conjunction with fuel cell means wherein a fuel and an oxidant chemically react with an electrolytic material to liberate electrical energy thereby generating an output voltage which can be applied to an external electric circuit, comprising; fuel cell means including electrode means capable of providing reaction area means wherein a fuel and an oxidant react with an electrolytic material to yield electric energy and at least one reaction product; said reaction product being released in said electrolytic material thereby affecting the output voltage of said fuel cell means; voltage reference means in circuit with a voltage sensitive relay and including connection means connected to said output voltage to sense any variation in said fuel cell output voltage; said voltage reference means including a voltage reference source connected to load compensation circuit means which varies said voltage reference means as said electric energy drawn from the fuel cell means varies; said voltage reference means further including a temperature reset circuit which varies said voltage reference means as an internal temperature of said fuel cell means varies; means to simultaneously control the relative quantities of said fuel and said oxidant to said fuel cell; and an electric valve to change the relative quantities of said fuel and said oxidant with said electric valve being controlled by said relay to admit an excess of one of said fuel cell inputs to carry off said reaction product to in turn maintain maximum output voltage from said fuel cell means.

5. A control system operating in conjunction with fuel cell means wherein hydrogen and oxygen chemically react with an electrolytic material to liberate electrical energy thereby generating an output voltage which can be applied to an external electric circuit, comprising; fuel cell means including electrode means capable of providing reaction area means wherein hydrogen and oxygen react with an electrolytic material to yield electric energy and water; said water being released in said electrolytic material thereby affecting the output voltage of said fuel cell means; voltage reference means in circuit with a voltage sensitive relay and including connection means connected to said output voltage to sense any variation in said fuel cell output voltage; said voltage reference means including a voltage reference source connected to load compensation circuit means which varies said voltage reference means as said electric energy drawn from the fuel cell means varies; said voltage reference means further including a temperature reset circuit which varies said voltage reference means as an internal temperature of said fuel cell means varies; means to simultaneously control the relative quantities of said hydrogen and said oxygen to said fuel cell; and an electric valve to change the relative quantities of said hydrogen and said oxygen with said electric valve being controlled by said relay to admit an excess of hydrogen to carry off said water to in turn maintain maximum output voltage from said fuel cell means.

References Cited by the Examiner

UNITED STATES PATENTS

| | | | |
|---|---|---|---|
| 2,384,463 | 9/1945 | Gunn et al. | 136—86 |
| 2,921,110 | 1/1960 | Crawley | 136—86 |
| 2,925,455 | 2/1960 | Eidensohn | 136—86 |
| 2,947,797 | 8/1960 | Justi et al. | 136—86 |
| 2,976,342 | 3/1961 | Morehouse et al. | 136—86 |
| 3,002,039 | 9/1961 | Bacon | 136—86 |
| 3,012,087 | 12/1961 | Van Billiard et al. | 136—160 |
| 3,106,494 | 10/1963 | Thorsheim | 136—86 |
| 3,112,228 | 11/1963 | Young | 136—86 |
| 3,112,229 | 11/1963 | Bacon et al. | 136—86 |
| 3,160,528 | 12/1964 | Dengler et al. | 136—86 |

WINSTON A. DOUGLAS, *Primary Examiner.*

JOHN R. SPECK, *Examiner.*

H. FEELEY, A. B. CURTIS, *Assistant Examiners.*